(12) United States Patent
Bolland

(10) Patent No.: US 6,938,635 B2
(45) Date of Patent: Sep. 6, 2005

(54) LEVEL SWITCH WITH VERIFICATION CAPABILITY

(75) Inventor: Daniel B. Bolland, Singapore (SG)

(73) Assignee: ExxonMobil Research and Engineering Company, Annandale, NJ (US)

(*) Notice: Subject to any disclaimer, the term of this patent is extended or adjusted under 35 U.S.C. 154(b) by 387 days.

(21) Appl. No.: 10/205,740

(22) Filed: Jul. 26, 2002

(65) Prior Publication Data

US 2004/0016457 A1 Jan. 29, 2004

(51) Int. Cl.[7] ............................................. G01F 23/18
(52) U.S. Cl. ........................ 137/2; 137/391; 137/557; 137/558; 141/95; 73/291; 73/299; 700/281; 702/55; 340/618; 340/626; 340/870.16
(58) Field of Search .............................. 73/290 R, 291, 73/299, 306, 308, 700, 861.49; 137/2, 386, 391, 557, 558, 392; 141/1, 83, 95; 340/501, 618, 623, 626, 870.16; 700/281; 702/50, 55, 98, 100

(56) References Cited

U.S. PATENT DOCUMENTS

| | | | | |
|---|---|---|---|---|
| 3,371,534 A | * | 3/1968 | Akeley | 73/299 |
| 4,111,218 A | * | 9/1978 | Hobbs | 137/2 |
| 4,265,263 A | * | 5/1981 | Hobbs | 137/2 |
| 4,386,623 A | * | 6/1983 | Funk et al. | 137/2 |
| 4,446,730 A | | 5/1984 | Smith | |
| 4,553,216 A | | 11/1985 | Stevens et al. | |
| 4,562,858 A | * | 1/1986 | Salina et al. | 137/392 |
| 4,602,344 A | * | 7/1986 | Ferretti et al. | 73/291 |
| 4,669,309 A | * | 6/1987 | Cornelius | 73/299 |
| 4,788,648 A | * | 11/1988 | Ferretti et al. | 73/291 |
| 4,956,763 A | * | 9/1990 | Stewart et al. | 137/386 |
| 5,351,725 A | * | 10/1994 | Suthergreen et al. | 141/1 |
| 5,604,315 A | * | 2/1997 | Briefer et al. | 73/861.49 |
| 5,827,963 A | * | 10/1998 | Selegatto et al. | 73/438 |
| 5,870,695 A | * | 2/1999 | Brown et al. | 702/138 |
| 6,082,392 A | * | 7/2000 | Watkins, Jr. | 73/291 |
| 6,157,894 A | * | 12/2000 | Hess et al. | 702/54 |
| 6,529,845 B1 | * | 3/2003 | Beck, II | 702/100 |
| 2004/0149031 A1 | * | 8/2004 | Bouchard | 73/301 |

FOREIGN PATENT DOCUMENTS

| | | |
|---|---|---|
| GB | 1384390 | 2/1975 |
| WO | WO 96/21845 | 7/1996 |
| WO | WO 01/92834 | 12/2001 |

* cited by examiner

*Primary Examiner*—Kevin Lee
(74) *Attorney, Agent, or Firm*—Malcolm D. Keen

(57) ABSTRACT

The present invention comprises a novel level switch which may be employed to detect liquid levels within a process vessel. The level switch of the present invention is self validating so that manual testing is not required in order to ensure proper operation and switch calibration. The switch of the present invention may be easily introduced into existing process vessel designs as a replacement for prior art level detection switches with minimal or no retrofitting effort being required. The self validating level switch of the present invention may be connected to a Safety Instrumented System (SIS) such that process control including process shutdowns to avoid overfilling and low-fluid conditions may be accomplished.

20 Claims, 1 Drawing Sheet

LEVEL SWITCH WITH VERIFICATION CAPABILITY

BACKGROUND

1. Field of the Invention

The present invention relates generally to the detection of high or low levels of fluid and more particularly to a level detection system which may be continuously validated to ensure proper operation.

2. Background of the Invention

It is often necessary or desirable to monitor the level of fluids within various containers and process vessels. For example, in connection with various chemical processes, fluids are processed within vessels and it is important for those managing the process to know when there is either a low level fluid condition or a high level fluid condition within the process level at any time during processing. In most cases, these conditions can not be detected merely by looking at the vessel since the vessel itself is typically non-transparent and, as a result, fluid levels would be unknown without one or more sensors being contained within the process vessel itself.

If fluid levels are too low, more fluid must typically be introduced into the vessel to ensure that the chemical process within the vessel continues without problems or to ensure that the vessel does not run dry creating the potential for equipment problems. This can be done manually by, for example, a technician opening a valve for some period of time to introduce additional fluid. Alternatively, or in addition, additional fluid may be added automatically by a control system which may, for example automatically open a valve to introduce additional fluid upon detection of a low-level condition. In the case of a high level condition, fluid may be drained though the use of a valve typically located towards the bottom of the vessel either automatically or manually as described above with respect to low level conditions.

In current practice, conventional level switches are used in connection with Safety Instrumented Systems (SIS) within the process industries. These switches typically activate at high or low levels in vessels and are used to signal automated control systems to prevent vessels from overfilling or running dry. However, with these switches, it is not possible to easily ensure that the switch will work and detect the out of range level at the critical time.

In most cases, with existing switches, it is necessary to manually test the switches to confirm that the switch will operate on demand and that there are no covert failures of the switch which would result in a failure to operate in a high or low fluid level situation. Unfortunately, such manual testing is a very time intensive task. For example, manual testing may be required to be performed at a pre-specified scheduled interval such as every six months. In addition, manual testing can often result in undesirable situations such as a case where the technician doing the test causes a false trip of the unit during testing. Even worse, manual testing may result in a situation where the technician unintentionally leaves the switch in a "bypassed" condition after a test such that during operation, out of range fluid levels will not be properly detected and/or remedied.

With current level detection switches functioning in an "on" or "off" status, as opposed to over an analog scale, it is not possible to employ other sensing elements within the vessel to use to comparison test against the switch. As a result, validation through the use of other sensors, even if they are analog, is not a workable solution. Manual testing, therefore, is the primary method of switch validation in most cases.

The on-off type level switches currently in use are typically characterized as having a "ball-cock" type float action. The rising or falling liquid level causes the float to move up or down which, in turn, may, at prescribed liquid levels, actuate an on-off electrical relay or switch. In most cases the relays or switches currently in use have a short range between upper and lower vessel taps. Usually the range is limited to 18 inches or less. These types of switches are subject to failures which are generally undetectable. For example, the failure modes may include failing to indicate a low level when the level is lower than the prescribed low level limit or failing to indicate a high level when the level is higher than the prescribed high level limit. In order to attempt to minimize and discover failures of this sort, manual testing is typically periodically performed.

SUMMARY OF THE INVENTION

According to a representative embodiment, the present invention comprises a novel level switch which may be employed to detect liquid levels within a process vessel. The level switch of the present invention is self validating under normal operating conditions so that manual testing is not required in order to ensure proper operation and switch calibration. The switch of the present invention may be easily introduced into existing process vessel designs as a replacement for prior art level detection switches with minimal or no retrofitting effort being required. The self validating level switch of the present invention may be connected to a Safety Instrumented System (SIS) such that process control including process shutdowns to avoid overfilling and low-fluid conditions may be accomplished.

DETAILED DESCRIPTION OF THE INVENTION

Figure 1:
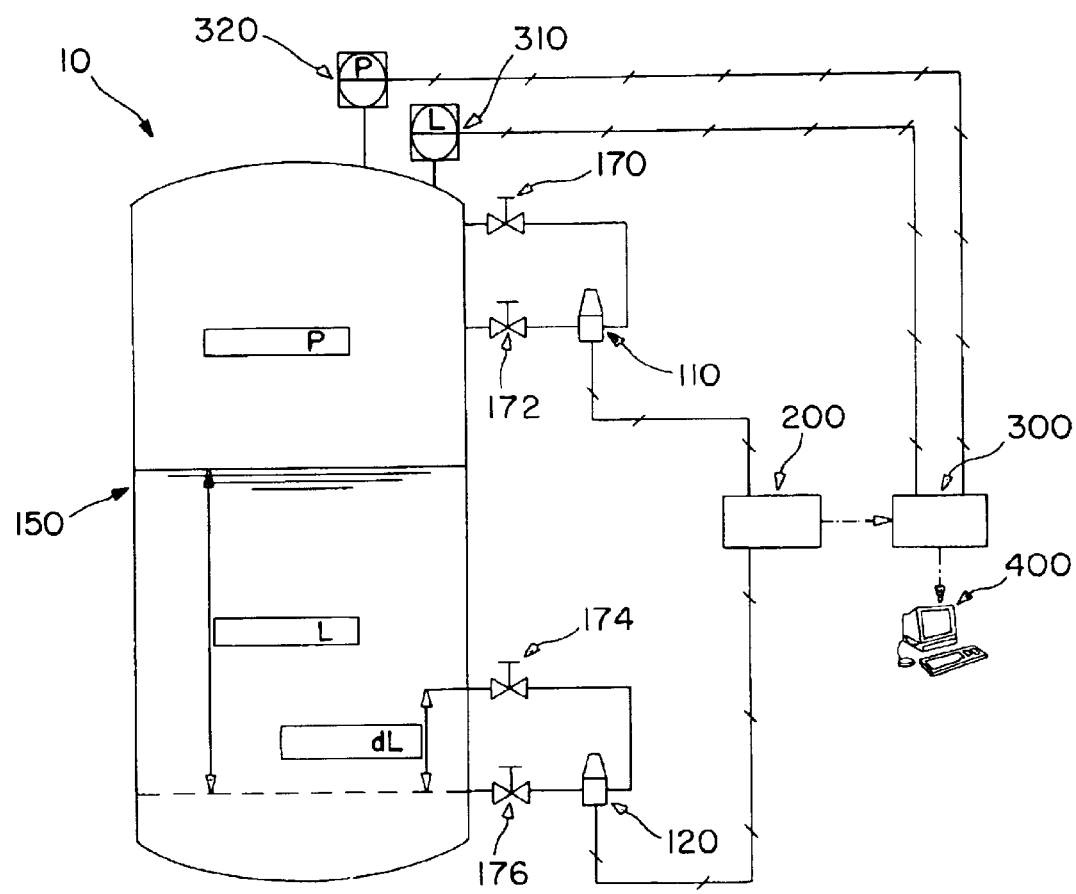
FIG. 1 is a schematic diagram illustrating two self validating level switches according to the present invention as implemented to provide level detection capability within an exemplary process vessel.

The present invention comprises a self-validating level switch that may be used in order to determine high and low fluid level conditions within a process vessel. The level switch of the present invention may provide the input to a Safety Instrumented System (SIS) in connection with control over process shutdown and other corrective actions as may be necessary based upon process conditions. The self-validating level switch of the present invention is capable of continuous self-validation meaning that the a significant level of reliability may be associated with the ability of the SIS to trip on demand and cause significant process control changes such as process shut down when necessary.

In addition to the benefit of continuous validation, the level switch of the present invention is beneficial in that it eliminates the need for manual testing for the confirmation of correct operation. As a result, the potential errors, time and effort expenditures and possible unsafe results typically associated with manual testing may be avoided.

The device of the present invention includes a sensor and transmitter that measures and transmits the difference in pressure between two points at different heights in the process vessel. In the case of a low level detection application, the two points are located below the normal liquid level and in the case of a high level detection application, the two points are above the normal liquid level. As will be understood by one of skill in the art, a single process vessel may be monitored according to the teachings of the present invention for both high and low level fluid conditions using two different sensors each with pressure detection presences at the points described above.

The differential pressure detected by the sensors provides a direct indication of the liquid level between the two points. According to the teachings of the present invention, the sensor also measures the static head pressure at the lower of the two points in either the low level detection or the high level detection application. The present invention utilizes both the differential pressure and the static head pressure to provide a composite output signal. The design of the level switch of the present invention is preferably such that it may be connected to a process vessel as a direct replacement for an existing prior art level switch such as a typical "on-off" level switch. Similarly, it will be understood by one of skill in the art that the level switch of the present invention preferably resembles an electronic "smart" differential pressure transmitter with inbuilt static head measurement capability. In general, modern transmitters ('smart' transmitters) include microprocessor components capable of performing calculations and algorithms as required.

According to the teachings of the present invention, the two parameters which are measured by the sensor/transmitter, differential pressure and static head pressure, are combined to form a single output signal. In the preferred embodiment of the present invention, such signal processing takes place within the sensor/transmitter unit itself, although processing could take place in connection with another system component as may be applicable to the particular design.

During normal process operation (fluid level within "normal" range) the output signal varies between pre-programmed limits depending upon the static head pressure only. During out of range situations (fluid level too high or too low), the output signal undergoes a significant change due to the liquid/vapor interface moving to a level within the vessel which is between the two fixed measurement points on the vessel. This signal change may be detected by a connected component such as a Safety Instrumented System (SIS) to initiate a shutdown of all or part of the process activity.

The variation of the output signal due to static head change only may be monitored and validated according to the present invention by measuring the actual static head pressure by other means such as other physical sensors which are also placed within the process vessel at the appropriate locations. This continuous or at least periodic validation of static head variations as between the sensor/transmitter device and the secondary validation sensors can be used to confirm that the sensing elements and related electronics and processing algorithms are functioning properly so that the output to a control system such as an SIS may be trusted.

Turning now to FIG. 1, a more detailed description of the level switch of the present invention as well as its operation in connection with a particular process vessel collectively making up system 10 is provided. The implementation illustrated in FIG. 1 includes two self validating level switches according to the present invention. Low level switch 120 serves to detect low fluid level conditions and high level switch 110 serves to detect high fluid level conditions. In a preferred embodiment low level switch 120 and high level switch 110 are attached to process vessel 150 via conventional isolating block valves.

The operating pressure (P) of vessel 150 is measured as is known in the art by pressure sensor 320 and the fluid level (L) in the vessel is measured as is known in the art by level sensor 310. Both measurements are fed to digital control system 300 such that these secondary measurements may be compared against measurements obtained by level switches 110 and 120 for automatic or periodic validation. In connection with the following description, it is assumed that the liquid contained within vessel 150 has a density (ρ) which is also made available to system 10 in connection with fluid measurement and process control operations.

As indicated in FIG. 1, the outputs of low level switch 120 and high level output switch 110 are fed to SIS subsystem 200. SIS subsystem 200 is also connected to control system 300 such that system 10 may be monitored and controlled based upon the fluid level within vessel 150. Control system 300 is also preferably connected to computing device 400. In one embodiment of the present invention, computing device 400 may be, for example, a personal computer or other business computing system which permits user input through a keyboard and/or other input devices as well as displaying information to a user via a display screen. As is known in the art, computing device 400 and control system 300 may be one in the same such as in a case, for example, where control system 300 comprises a combination of hardware and software resident on computing device 400.

For low level switch 120, the static pressure at lower isolation tap 176 is given by:

$$\text{Static Pressure } (SP) = P + \rho * g * L$$

where g=gravitational constant and where P and L are operating parameters of the vessel which can be separately measured by sensors 310 and 320 as processed by control system 300, if necessary.

The teachings of the present invention may be used in both open (to atmosphere) and closed process vessels. For closed process vessels, the static pressure (SP) may be dominated by the vessel operating pressure (P). In addition, the process vessel may go through a 'start-up' mode whereby the vessel is initially operated at low pressures (atmospheric) and subsequently brought up to 'operation' at a much higher operating pressure. The operating pressure may be, for example, 250 psi with minimum and maximum operating pressures of 200 to 300 psi. The self diagnostic principle of the level switch of the present invention relies on the fluctuation in static pressure and the sensitivity of this feature is maximized if the range of pressures considered is limited to the normal operating range (200 to 300psi in this example). Thus the switch should incorporate a feature whereby the diagnostic capability is switched on when the process reaches its normal operating range.

At pressures below the normal operating range (during start-up), the switch will operate as a switch only, with no diagnostic features. The ability to switch on the diagnostic feature when the device reaches a minimum operating pressure may be applied to both the low and high level switch embodiments of the device. The ability to automatically switch on the diagnostic feature only when the process reaches normal operating pressures reduces the likelihood of nuisance alarms during the start-up phase. The minimum and maximum operating pressure conditions of the device are preferably programmed into the device prior to installation. A configuration menu may be used to 'switch on' the diagnostic feature when the process reaches minimum operating pressure.

Further for low level switch 120, the delta pressure between the two taps 174 and 176 is given by:

Delta Pressure $(dP)=x*dL*g*\rho$

Where 'x' is the fraction of distance dL which is liquid covered.

The static pressure value and the delta pressure value are provided as inputs to an algorithm for determining the output value of the device as follows:

If P is less than minimum operating pressure:
  Output Value=Function (dP)
If P is greater than minimum operating pressure:
  Output Value=Function (SP, dP)

As such, during normal operation, the output value from low level switch 120, which varies over time, is a function of two inputs, the Static Pressure SP measured at the lower process isolation tap 176 and the delta pressure measured between the two taps 176 and 174.

The same calculations are performed in connection with high level switch 110 in order to detect high fluid level conditions as well as validate operation of high level switch 110 as follows. For high level switch 110, the static pressure at lower isolation tap 172 is given by:

Static Pressure $(SP)=P$ where P is an operating parameter of the vessel which can be separately measured by sensor 320 as processed by control system 300, if necessary. For the high level switch, the process liquid level is normally below the lower tap location and thus there is no $\rho*g*L$ component of the static pressure. Further for high level switch 110, the delta pressure between the two taps 170 and 172 is given by:

Delta Pressure $(dP)=x*dL*g*\rho$

Where 'x' is the fraction of distance dL which is liquid covered.

In the above low and high level switch examples, with a normal liquid level between the low and high level switches, x will be equal to 1 (max dp pressure) for the low liquid level switch and will be equal to zero (minimum dp pressure) for the high liquid level switch.

For high level switch 110, the static pressure value and the delta pressure value are provided as inputs to an algorithm for determining a status output value as follows:

If P is less than minimum operating pressure:
  Status Output Value=Function (dP)
If P is greater than minimum operating pressure:
  Status Output Value=Function (SP, dP)

As such, during normal operation, the status output value from high level switch 110, which varies over time, is a function of two inputs, the Static Pressure SP measured at the lower process isolation tap 172 and the delta pressure measured between the two taps 170 and 172.

The two signals, Static Pressure SP and Delta Pressure dP are processed by combining them to form a composite output signal within the high or low level switch units 110 or 120.

In many situations, the component values of SP and DP are also available within the control system 300 or other computing system 400. SP is available by separate measurement of vessel level L, 310 and pressure P, 320. Knowledge of distance between taps dL and liquid density allows a calculation of DP. Combining these separately generated values of SP and DP generates a parameter which can be used to validate the level switch output. This validation calculation can also be done manually for example by measuring liquid level via a vessel gauge glass and pressure via a pressure gauge.

The mathematical formula for the combination of SP and dP is multiplicative as is demonstrated in the following example for a low level switch. For a level switch transmitter with conventional 4–20 mA output signal and assuming the following parameters:

Minimum operating pressure=$P_{min}$

Maximum operating pressure=$P_{max}$

Operating Static pressure=$SP$

Desired Level Switch Point=$0.5\ dL$ (mid way between taps)

For a traditional 4–20 mA output signal from a transmitter, the output signal is normally generated using the ratio of the actual measured variable to the maximum value (maximum range) of the measurement under consideration. For a 4–20 mA signal, this results in generic equations of the form:

Output=(measured variable)/(max range of measured variable)*16+4 mA

For the differential pressure measurement, the maximum range of the measured variable is $dL*g*\rho$ while the measured variable is $x*dL*g*\rho$ where x is the fraction of distance dL which is liquid covered. As can be seen from the above equation, as the measured variable changes from zero to maximum, the value of the output will vary from 4 to 20 mA.

Based on the above generic equation, and using suitable scaling factors in the transmitter as will be understood by one of skill in the art, the following example equations are applicable for the low level switch embodiment of the device. As will be understood by those skilled in the art, a similar set of example equations would equally apply to the high level switch application:

If $P_s<P_{min}$ Output=$x*K1+K3$ mA  (1)

If $P_s>=P_{min}$ Output=$x*K1*(1+K2*(SP-P_{min})/(P_{max}-P_{mim}))+K3$ mA  (2)

K1 and K2 are programmable variables in high level switch 110 and low level switch 120. K3 is a constant value used to give a 'live zero' output signal. For the low level switch example K3=4mA.

For the low level switch case, consider the first equation (1) and assume K1=8mA. When the level is above the level switch upper tap, x=1 and the output is 8+4=12 mA. This is mid range of a 4–20 mA transmitter. When the level has dropped to a low level situation, mid way between the two level taps, x=0.5 and the output is 4+4=8 mA.

Consider the second equation (2) and assume K1=8 and K2=0.5. The first part of the equation is the same as in equation (1), whilst the second part of the equation represents the static pressure validation component.

At $SP=P_{min}$ Output=12 mA

At $SP=P_{max}$ Output=16 mA

Thus as long as the level remains above the upper level switch tap 174, the output varies between 12 and 16 mA dependant on fluctuations in the static pressure measurement at the lower level switch tap 176. The range of fluctuation can be increased by changing the K2 factor in equation (2). For example, if K2=0.75, the output would range from 12 mA to 18 mA. If K2=1, the output would range from 12 mA to 20 mA.

For equation (2), consider the output when the level in the vessel has dropped to mid way between the two vessel taps (x=0.5) and K1=8, K2 =0.5.

At $SP=P_{min}$ Output=8 mA

At $SP=P_{max}$ Output=10 mA

Similarly, when the level has dropped to ¼ the distance between the two taps (x=0.25)

At $SP=P_{min}$ Output=6 mA

At $SP=P_{max}$ Output=7 mA

Finally, when the level drops to the lower vessel tap 176, the output will be 4 mA irrespective of the value of the static pressure SP. This is equivalent to a zero reading in a conventional 4–20 mA transmitter signal.

As can be seen from the above equations, the operating principle of the device has the output signal varying with static pressure and level between the two vessel taps. The output signal when the level is mid-way between the two taps may have a range of values:

| | |
|---|---|
| In start-up mode (no pressure effects) | 8 mA |
| When operating pressure is at max value | 10 mA |
| When operating pressure is at min value | 8 mA |

Over the complete operating range $P_{min}$ to $P_{max}$ the output will drop below the 12 mA 'mid range' signal level of the 4–20mA transmitter when the level has dropped to mid point between the vessel taps.

In a typical level switch application, the absolute value at which 'low level' is detected and alarmed is normally not critical. What is critical is that the switch detects that the level has dropped to between the two process taps. The system designer may therefore select the 8 mA signal as an alarm or trip point to indicate a low level.

It will be clear to those skilled in the art, that variations in the output value of the switch and specifically the proportion of the output generated by the static pressure variation can be achieved by adjusting the factors in the above equation. The principle adjusting factors being the K1 factor in the x*K1 part of the equation and the K2 factor in the $(1+K2*(SP-P_{min})/(P_{max}-P_{min}))$ part of the equation.

It will also be clear to those skilled in the art, that the above equations which apply to the low level switch example, can be equally applied to the high level switch example.

The equation (2) demonstrates the capability of the device to generate a 'bad process variable' signal. If the differential pressure component of the equation fails or reaches zero, the output of the device will drive to 4 mA (zero signal). Similarly, if the static pressure (SP) measurement component fails or reaches zero, the 'pressure variation' part of the equation, $K2*(SP-P_{min})/(P_{max}-P_{min})$ will become a high negative value driving the output calculation to a zero (4 mA) or less than zero value. An output excursion to zero signal can be used by the attached Safety Instrumented System 200 to generate an appropriate response (trip or bad process variable alarm) dependant on the decision of the system designer.

In a preferred embodiment of the present invention, three fundamental operating principles are followed so as to achieve the desired results. The first principle is that the Static Pressure SP and Delta Pressure dP signals are combined within the level switch device 110 or 120 to ensure that failure to measure either parameter will result in a zero or less than 4 milliamp output signal. Such may be the case if low level switch 120, high level switch 110, or any of the sensing capabilities of any of taps 170, 172, 174 or 176 fails in some way. Additionally, it is preferable that if either SP or dP is measured as zero, the resulting output signal is again either zero or some value which is less than 4 milliamps.

Either of the cases described above preferably results in Safety Instrumented System 200 being placed in "bad process variable mode" or some similar mode. In this case and in response to entry into this mode, action taken by system SIS 200 is as may be determined and preset by a system engineer.

The second major principle associated with the operation of system 10 of the present invention is that any imposed change on the Static Pressure component should result in a similar change in the output signal. Thus, for example, if a sine wave pressure fluctuation is added to the Static Pressure component, the output signal would reflect a sine wave whose amplitude and phase angle would directly correlate to the imposed signal on the Static Pressure component. Similarly, changes to Static Pressure, as calculated by system 10, during normal process operation should directly impact the output signal such that the changes are correlated. The relationship between Static Pressure and output signal are clearly illustrated in the equation (2) described above.

The third major principle of operation of the level detection system 10 disclosed herein is that it is preferred that scaling factors be used for the Delta Pressure dP and Static Pressure SP signals in order to ensure that the Delta Pressure component is the dominant parameter in determining the output signal. Each of the three principals is now discussed in more detail in connection with the continued discussion of the operation of system 10 and the level switches 110 and 120 of the present invention.

The first principle ensures that by validating the output signal based upon the operation of level switches 110 and 120 against known changes in operating static head pressure, the overall performance of system 10, and in particular level switches 110 and 120, can be validated. It is important to ensure correct operation by validating that both the Delta Pressure dP and Static Pressure SP measurements and calculations are correct. Further, it is important that situations in which inaccurate or improper operation of level switches 110 and 120 is present that the selected remedial action be taken. This is effected by causing the entry into bad process variable mode in the event of no signal or a zero signal for either dP or SP.

The second principle of the present invention allows for validation of the device by monitoring output changes and comparing against known changes in static pressure. Validation may be performed on a continuous basis as controlled by control system 300 and/or computing device 400. This can be done by comparing normal process fluctuations in static pressure with the corresponding output of the level switch devices. Alternatively, validation may be performed by periodically making imposed changes in static pressure (level change or vessel pressure change). For example, the process operator may introduce a level or static pressure change in the vessel of known magnitude. This change will cause a change in output of the level switch device which can be compared with what would be expected due to the imposed level or pressure change. In either case validation may be achieved through observation or by conventional statistical correlation techniques. Statistical correlation may be performed automatically by a computing system by comparing changes in vessel pressure and level with changes in output of the level switch device.

In another embodiment of the invention, the output equation of the sensors 110 and 120 can incorporate a known time varying fluctuation of the output signal. This known fluctuation could be, for example, a cyclic sine wave function of known magnitude and period. In the SIS 220 or control system 300, the magnitude and frequency of this cyclic output can be measured and used to further validate the correct performance of the sensor device. In effect the sensor is 'fingerprinted' by a known frequency and amplitude component. The control system 300 monitors this 'fingerprint' to confirm sensor validity.

The third principle of the present invention ensures that the critical function of system 10, high or low level detection results in a significant change in the output signal such that SIS 200 and/or control system 300 may react appropriately to out of range conditions.

System 10 and particularly the operation of level switches 110 and 120 can be further validated at any time by making known adjustments to the operating static head pressure or operating level and comparing the change in output with a calculated value corresponding to the imposed change in static pressure.

A variation of system 10 provides for a Fieldbus or "HART" digital protocol output from the level switches 110 and 120 such that enhanced verification is obtainable via the availability of separate delta pressure and absolute pressure signals at SIS 200. As will be known to those expert in the art, Fieldbus or other digital protocol transmission systems would allow for the transmission of the composite signal (differential pressure and static pressure combined) plus the transmission of the individual component measurements, differential pressure and static pressure. With this digital data transmission mode, the static pressure component of the level switch device 110 and 120 may be validated separately by comparing with vessel pressure and level from devices 320 and 310. Fieldbus or other digital communication configurations may also allow for interactive communication between the sensor devices 110 and 120 and the connected SIS 220 or control system 300 or computing system 400. Interactive communication would allow an application in any of the computing devices to adjust parameters K1 and/or K2 as part of an on-line validation routine. If K1 and K2 are adjusted a known amount, the computing device will be able to calculate the predicted change in the composite output (SP and DP). By comparing the computed output with the actual output, an automatic device validation routine can be established.

The ability to interactively communicate with field sensors to modify parameters in the calculation equations of such sensors and by so doing, confirm the correct functioning of the computational parts of the sensor device is one key aspect of system 10 of the present invention. Modification of sensor parameters to force a change in sensor output and comparing the change in sensor output against a calculated value of the change based on knowledge of the magnitude of sensor parameter change, can be an additional validation technique for the system of the present invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. Further, the concept of adding validation routines to other sensors in similar important Safety Instrumented System applications is a variation of this present invention which can be implemented in connection with other applications. The scope of the invention is to be defined only by the claims, and by their equivalents.

What is claimed is:

1. An apparatus for measuring the level of a liquid in a vessel comprising:
   (a) a first sensor and a second sensor for measuring the pressure of the liquid in the vessel at a first point and a second point, respectively, wherein said first point is located below said second point within the vessel;
   (b) a first processor for calculating the difference in liquid pressure between said first point and said second point and generating a differential pressure signal therefrom;
   (c) a sensor for measuring the static head pressure at said first point and generating a static head pressure signal therefrom;
   (d) a second processor for combining said differential pressure signal and said static head pressure signal to generate a composite output signal;
   (e) wherein an out-of-range condition for said liquid is created based upon a pre-determined change in said composite output signal.

2. The apparatus of claim 1 wherein said first sensor and said second sensor comprise a low liquid level detection switch.

3. The apparatus of claim 1 wherein said first sensor and said second sensor comprise a high liquid level detection switch.

4. The apparatus of claim 1 further comprising a third sensor for measuring the pressure of the liquid in the vessel at a third point and a fourth sensor for measuring the pressure of the liquid in the vessel at a fourth point, wherein said third point is located below said fourth point in said vessel, wherein said first and second sensors comprise a high liquid level detection switch for determining when the liquid is above a certain point in the vessel and wherein said third and fourth sensors comprise a low liquid level detection switch for determining when the liquid is below a certain point in the vessel, wherein said first processor further calculates the difference in liquid pressure between said third point and said fourth point and generates a second differential pressure signal therefrom, and wherein said apparatus further comprises a sensor for measuring the static head pressure at said third point and generating a second static head pressure signal therefrom and wherein said second processor further combines said second differential pressure signal and said second static head pressure signal to generate a second composite output signal wherein a low level condition for said liquid is created based upon a pre-determined change in said second composite output signal.

5. The apparatus of claim 1 further comprising a pressure sensor for determining the pressure within the vessel and a level sensor for measuring the liquid level within the vessel and wherein said measurements are compared against those obtained by said first and second sensors and said sensor for measuring the static head pressure.

6. The apparatus of claim 1 wherein said out-of-range condition signals an alarm to be generated.

7. The apparatus of claim 1 wherein said out-of-range condition causes the introduction of additional liquid into the vessel in the case of a low-level condition and the removal of liquid from the vessel in the case of a high-level condition.

8. The apparatus of claim 6 wherein said out-of-range conditions do not signal an alarm when the pressure in the vessel is below normal operating range or during start-up phase.

9. The apparatus of claim 1 wherein a bad process signal is generated as a result of said differential pressure signal being at or near zero or not detectable.

10. The apparatus of claim 1 wherein a bad process signal is generated as a result of said static head pressure signal being at or near zero or not detectable.

11. A method for measuring the level of a liquid in a vessel comprising the steps of:

(a) measuring the pressure of the liquid in the vessel at a first point and a second point, wherein said first point is located below said second point within the vessel;

(b) calculating the difference in liquid pressure between said first point and said second point and generating a differential pressure signal therefrom (c) measuring the static head pressure at said first point and generating a static head pressure signal therefrom;

(d) combining said differential pressure signal and said static head pressure signal to generate a composite output signal;

(e) indicating an out-of-range condition for said liquid based upon a pre-determined change in said composite output signal.

12. The method of claim 11 wherein said liquid level is measured in order to determine whether a low-level condition is present.

13. The method of claim 11 wherein said liquid level is measured in order to determine whether a high-level condition is present.

14. The method of claim 11 further comprising the steps of:

(a) measuring the pressure of the liquid in the vessel at a third point and measuring the pressure of the liquid in the vessel at a fourth point, wherein said third point is located below said fourth point in said vessel and wherein the measurements at said first and second points are used to determine when the liquid is above a certain point in the vessel and wherein the measurements at said third and fourth points are used to determine when the liquid is below a certain point in the vessel;

(b) calculating the difference in liquid pressure between said third point and said fourth point and generating a second differential pressure signal therefrom;

(c) measuring the static head pressure at said third point and generating a second static head pressure signal therefrom;

(d) combining said second differential pressure signal and said second static head pressure signal to generate a second composite output signal wherein a low level condition for said is created based upon a pre-determined change in said second composite output signal.

15. The method of claim 11 further comprising the step of generating an alarm when an out-of-range condition is detected.

16. The method of claim 11 further comprising the step of introducing additional liquid into the vessel when said out-of-range condition is indicated as a low-level condition.

17. The method of claim 11 further comprising the step of removing liquid from the vessel when said out-of-range condition is indicated as a high-level condition.

18. The method of claim 15 wherein said out-of-range conditions do not signal an alarm when the pressure in the vessel is below normal operating range or during start-up phase.

19. The method of claim 11 wherein a bad process signal is generated as a result of said differential pressure signal being at or near zero or not detectable.

20. The method of claim 11 wherein a bad process signal is generated as a result of said static head pressure signal being at or near zero or not detectable.

* * * * *